FABRICATION OF MOLDED NEGATIVE ELECTRODE

ZINC WITH OXIDE FILM

COATED WITH GLYCERINE

MERCUROUS CHLORIDE ADDED

AMMONIUM CHLORIDE ADDED

COMPACTED AND AMMONIUM CHLORIDE SOLUTION ADDED

SURFACE OF ZINC PARTICLES AMALGAMATED

ZINC-MERCURY ALLOY ANODE MATERIAL

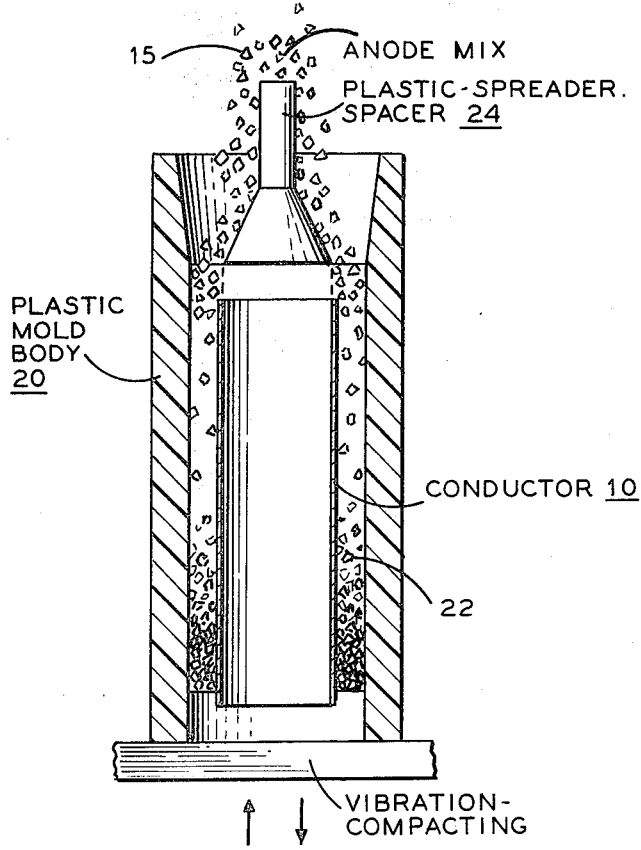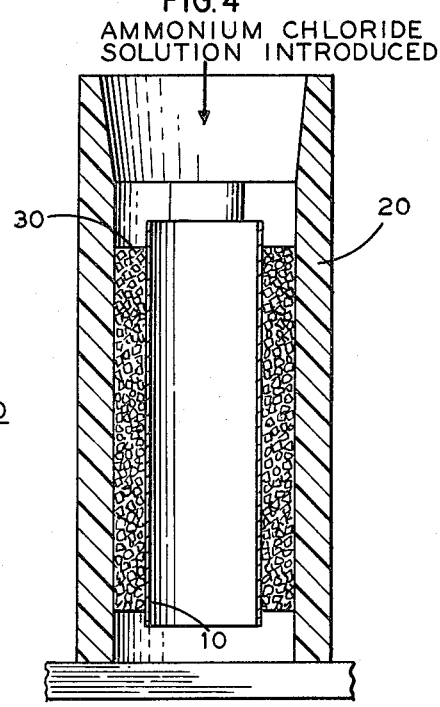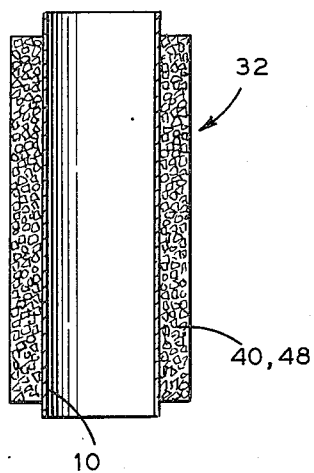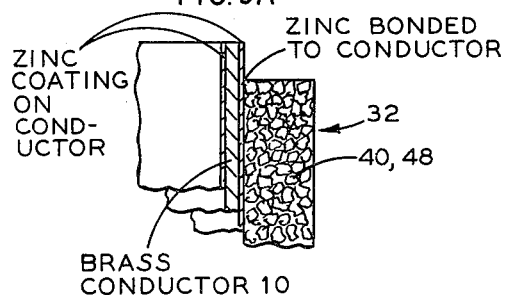

3,669,754
PROCESS OF MAKING A MOLDED NEGATIVE ELECTRODE
Robert E. Ralston, Spring Valley, and Yung Ling Ko, Tarrytown, N.Y., assignors to P. R. Mallory & Co., Inc., Indianapolis, Ind.
Filed June 13, 1969, Ser. No. 832,899
Int. Cl. H01m 13/08
U.S. Cl. 136—126          3 Claims

ABSTRACT OF THE DISCLOSURE

A base or support of conducting metal provided with a zinc surface, alloyed or electroplated, is amalgam alloyed with mercury, and has bonded to said amalgam a porous body of zinc particles individually amalgam covered with mercury and bonded to each by mutual common layers of amalgam, and said mercury amalgam serving also to bond the porous body to said conducting base.

---

This invention relates to porous metal electrodes, and, particularly, to a molded porous negative electrode.

Porous metal electrodes, such as zinc or zinc alloys, are required for high discharge rates from electrochemical cells. They must also be of low electrical resistance, such as that obtained with good particle-to-particle contact, as by bonding. It is also desirable that good electrical contact of low resistance be maintained between the anode metal base and the anode collector supported thereby, which may also be achieved by bonding.

One object of this invention is to provide a molded negative electrode, and a method of forming such an electrode, that will have a low resistance, and be capable of operating at a high discharge rate.

Another object of this invention is to provide a molded negative electrode, and a method of forming such electrode, in which good particle-to-particle bonding is present.

Another object of this invention is to provide a molded negative electrode, and a method of forming it, in which good particle-to-particle bonding is established by a process involving the operation of amalgamation.

This invention relates to such a negative electrode which meets all of the above goals, and is fabricated by a process which might be called "wet amalgamation bonding." A mixture of the following composition has been used to prepare electrodes of 65% porosity:

46.6 g. zinc
6.0 g. mercurous chloride
5.0 g. ammonium chloride
1 drop glycerine In mixing, one drop of glycerine is added to the proper weight of zinc particles of —100, +200 mesh, and mixed thoroughly to wet and cover the surfaces of the zinc particles. Mercurous chloride is added, again with complete mixing, to coat the surface of the zinc with amalgamating material. Ammonium chloride is then added and dispersed evenly. The mix is then ready for use.

The molded electrode is made by amalgamation-bonding zinc particles to a conductor of brass, or zinc plated brass, or amalgamated zinc plated brass. Pre-amalgamation not only cleans the surface but also decreases the tendency of the zinc plate on the conductor to be stripped off or go into solution in the ammonium chloride solution. This is accomplished by placing the conductor in a mold conveniently made of plastic, and applying the correct amount of electrode mix in contact with the surface to be bonded. Excess air is expelled and good particle-to-particle relationship established by vibration compacting. While still confined in the mold, a quantity of saturated ammonium chloride solution is added to wet the electrode material and to initiate the reaction process. After approximately 15 minutes the electrode can be removed from the mold and placed in a solution of ammonium chloride, for twelve hours or more, to allow the bonding reaction to reach completion; and then the electrode is washed and dried.

The bonding action by this technique might be called solution sintering by liquid mercury. The initial reaction is the chemical displacement of zinc by mercury, depositing liquid mercury over the entire zinc surface. Immediately the mercury begins to alloy with the clean zinc, since the ammonium chloride acts as a flux to clean the zinc surface of oxide, and other unwanted matter, and the surface changes from 100% mercury to about 10% mercury as the homogeneous alloy forms. However, during the early stages of the alloy formation, zinc dissolves in the liquid mercury which is concentrated at the points or areas of contact between particles, and forms a solid solution bond at these contact points or areas when the alloy formation is complete. The same type of bonding is also accomplished at the surface of the anode collector.

The superiority of the molded anode has been demonstrated by the performance of alkaline manganese cells at minuts 40°. The following service was obtained with "C" cells on an intermitent duty cycle of four minutes on load per hour, ten hours per day, five days per week to an end voltage of 0.93 volts on a 7.5 ohm load:

|  | Minutes |
|---|---|
| Conventional Brand A | 3 |
| Conventional Brand B | 11 |
| This invention Molded Anode | 190–200 |

The operations are shown in detail in the drawings, in which

FIGS. 3 and 4 show the steps of forming the porous structure on the supporting tubular structure;

FIGS. 5 and 5A show the final anode structures; and

Figure 1:
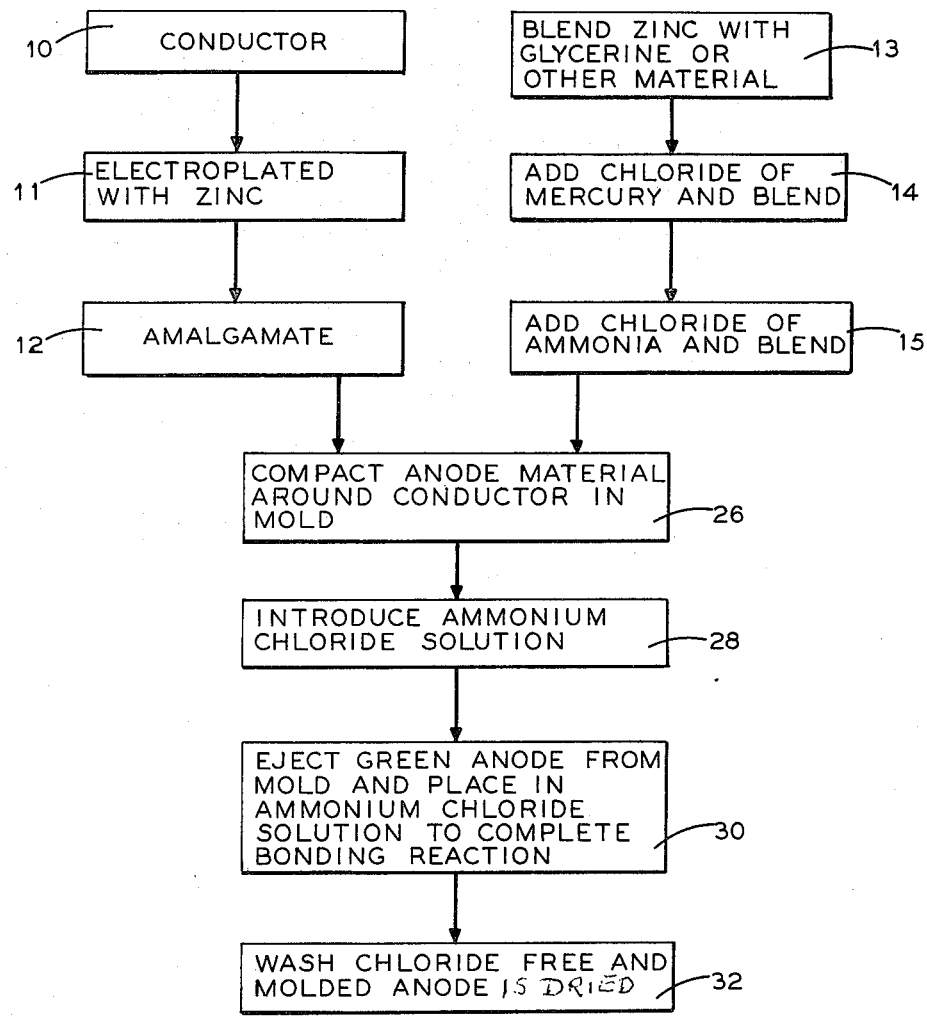
FIG. 1 is a functional flow chart of the steps of the process.

As shown in FIG. 1, the conductor 10, as a base, is provided with a zinc surface either by electroplating 11, or if the base is of brass, the zinc ingredient serves as an element for receiving mercury in amalgam 12 to form a surface bonding layer.

Separately, a measured mass of zinc particles is treated as indicated in the blocks 13, 14 and 15 of the diagram of FIG. 1 to cover the zinc particles individually with an amalgam or covering layer, and thus to form an anode mix.

The conductor 10 is then disposed centrally in a suitable plastic mold 20, as in FIG. 3, in spaced relation, to define an annular cylindrical space 22 for receiving the anode mix of block 15. A spreader 24 is shown to establish uniform distribution of the particles in the space 22, encircling the conductor 10.

The assembly of the conductor 10 and the anode mix 22 in FIG. 3 is then subjected to vibration for compacting the particle mix in the mold 20, as indicated in block 26 flow-chart of FIG. 1. Ammonium chloride, as in block 28, is introduced to promote further reaction and amalgamating action between individual adjacent particles, as in block 15, and between particles and the base of supporting conductor 10. At this stage the green anode structure, as in FIG. 4, is sufficiently coherent to be handled. The green anode 30 is then placed in another container in another solution of ammonium chloride to complete the bonding reaction, after which the anode structure 32, now formed and molded, is washed to remove all non-reacted chloride and dried ready for use in a battery.

The sequence of illustrations in FIGS. 2A through 2G show how the zinc particles 40 are modified step by step from initial individual particle condition to final amalgam-bonded structure.

Figure 2A:
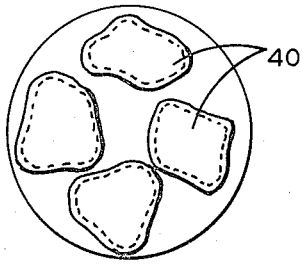
FIGS. 2A through 2G are schematic showings of the steps of forming the porous structure.
Figure 2B:
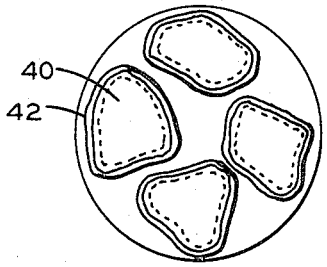
Figure 2C:
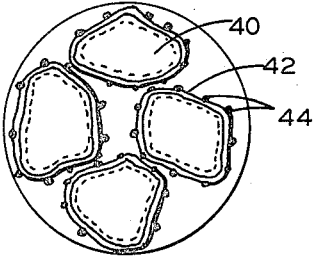
Figure 2D:
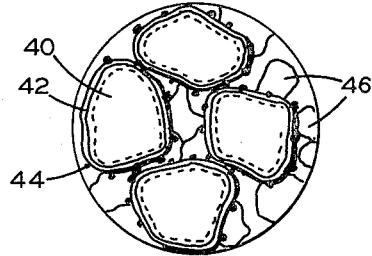
Figure 2E:
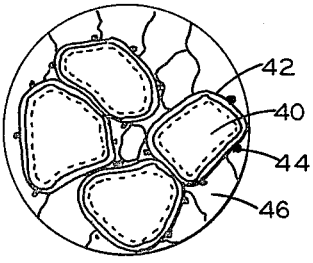
Figure 2F:
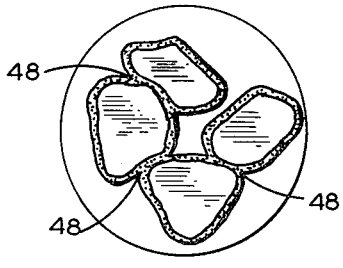
Figure 2G:
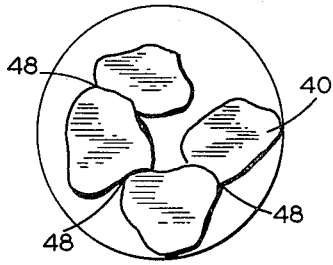

Thus, the zinc particles 40 of FIG. 2A are surface wetted with glycerine 42 in FIG. 2B, then blended with mercurous chloride 44 which can be distributed freely and homogeneously, as in FIG. 2C, due to the fluid glycerine layer 42. Ammonium chloride crystals 46 are then added and blended for thorough mix and distribution, as in FIG. 2D. The mix in FIG. 2D is then vibrated to compact the mass of particles, by the action indicated in blocks 26 of FIG. 1, and as shown in FIG. 3, to the condition indicated in FIG. 2E. Ammonium chloride in solution is added as in FIG. 4, and the continued reaction establishes additional alloying while at the same time forming amalgam bonding 48 between adjacent particles, and between particles and the supporting conductor 10, as in FIG. 5, to the condition indicated in FIGS. 2G and 5A. The structure of FIG. 5 is then washed, to remove excess chloride, and dried for use in a battery.

As indicated somewhat schematically in FIG. 5A, the anode structure on the supporting conductor 10 is relatively porous, to the extent of the packing density permitted by the shapes and sizes of the original particles, with the added thickness of the amalgam layer on each particle which enters into the mutual bonding layer. The dimensions of the anode are limited by the procedures of formation to the mold spacing and the measured quantity of particles. The anodes thus formed are therefore substantially uniform in dimension and in operating characteristics.

Figure 6:
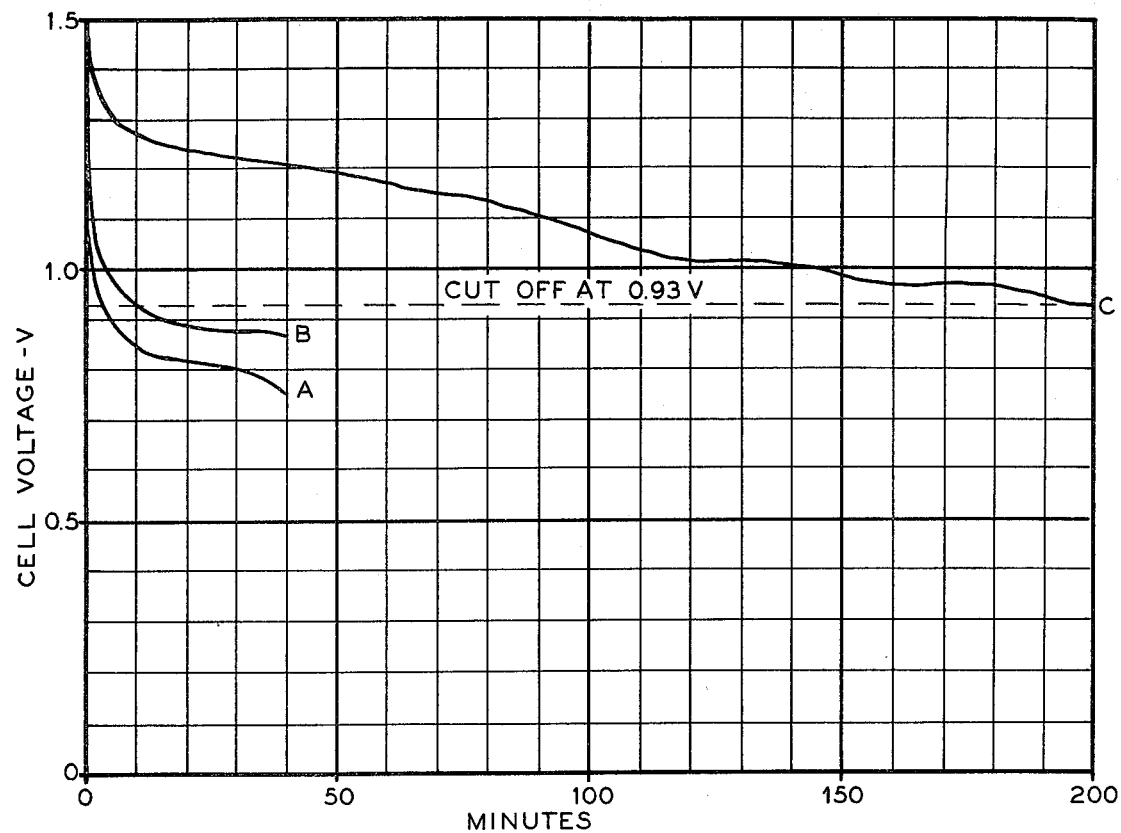
FIG. 6 shows a discharge curve of a cell equipped with an anode of this invention.

With an anode of this invention in an alkaline manganese cell at minus 40°, curve C of FIG. 6 shows the service obtained with "C" cells on an intermittent duty cycle of 4 minutes on load per hour five days per week, to an end voltage of 0.93 volt on a 7.5 ohm load. Curves A and B show results of two conventional cells.

The invention herein thus discloses a molded porous electrode, having predetermined dimensions, and being porous to provide relatively large current-producing area as an electrode.

Modifications may be made in the procedural steps and structural arrangement, without departing from the spirit and scope of the invention.

What is claimed is:
1. The method of fabricating a porous molded negative electrode on a supporting base having an amalgamated zinc surface, which consists in:

separately preparing an anode mix of zinc particles, by completely wetting the surfaces of zinc particles with glycerine, then mixing the wetted particles completely with a quantity of mercurous chloride to coat the surfaces of the wetted zinc particles, and then further mixing the coated zinc particles with a quantity of chloride of ammonia to constitute an anode mix to apply to a supporting base;

disposing said anode mix against a supporting base having an amalgamated zinc surface in a confined space and compacting said anode mix to form a coherent body to establish close surface contact coupling between said supporting base and the particles of said anode mix, and between particles within the anode mix;

applying an ammonium chloride solution to said coherent body so as to initiate a bonding reaction while said body is confined;

and then removing said body from said confined space and placing said body in another ammonium chloride solution to complete the bonding reaction;

washing said body with water to remove the chloride and then drying said body.

2. The method of claim 1, in which
the original zinc particles are of a size between minus 100 and +200 mesh.

3. The method of claim 1, in which said supporting base is an electrical conductor of brass, and zinc has been bonded thereto as a layer to serve as a receiving base.

References Cited
UNITED STATES PATENTS

| | | | |
|---|---|---|---|
| 3,368,925 | 2/1968 | Denison | 136—30 |
| 3,075,032 | 1/1963 | Andre | 136—127 X |

FOREIGN PATENTS

| | | | |
|---|---|---|---|
| 1,523,090 | 3/1968 | France | 136—30 |

WINSTON A. DOUGLAS, Primary Examiner

M. J. ANDREWS, Assistant Examiner